United States Patent [19]
Chen et al.

[11] Patent Number: 5,914,821
[45] Date of Patent: Jun. 22, 1999

[54] TORUS CONFORMAL WINDOW AND SENSOR SYSTEM USING THE WINDOW

[75] Inventors: Chungte W. Chen, Irvine; Darcy J. Hart, San Diego; Stephen C. Fry, Hermosa Beach, all of Calif.

[73] Assignee: Raytheon Company, Lexington, Mass.

[21] Appl. No.: 08/944,910

[22] Filed: Oct. 6, 1997

[51] Int. Cl.$^6$ .................................................. G02B 3/08
[52] U.S. Cl. ........................................................ 359/711
[58] Field of Search ................................. 359/708–718

[56] References Cited

U.S. PATENT DOCUMENTS

| 4,312,573 | 1/1982 | Sternberg | 359/718 |
| 5,191,324 | 3/1993 | Rydel | 359/711 |
| 5,526,181 | 6/1996 | Kunick et al. | 359/708 |

FOREIGN PATENT DOCUMENTS

| 0 560 999 | 9/1993 | European Pat. Off. . |
| 0 585 867 | 3/1994 | European Pat. Off. . |
| 0 616 187 | 9/1994 | European Pat. Off. . |
| 0 848 273 | 6/1998 | European Pat. Off. . |
| 2 194 269 | 3/1998 | United Kingdom . |
| 87/03681 | 6/1987 | WIPO . |

*Primary Examiner*—Scott J. Sugarman
*Attorney, Agent, or Firm*—Colin M. Raufer; Leonard A. Alkov; Glenn H. Lenzen, Jr.

[57] ABSTRACT

A window is made of a curved piece of a transparent material having a front surface and a back surface. At least one of the front surface and the back surface has a shape which is a segment of a convex aspheric shape rotated about a center, otherwise known as a torus.

11 Claims, 2 Drawing Sheets

TORUS CONFORMAL WINDOW AND SENSOR SYSTEM USING THE WINDOW

BACKGROUND OF THE INVENTION

This invention relates to windows, and in particular to conformal windows used in aircraft sensor systems.

An optical sensor receives radiated energy from a scene and converts it to an electrical signal. The electrical signal is provided to a display or further processed for pattern recognition or the like. Optical sensors are available in a variety of types and for wavelengths ranging from the ultraviolet, through the visible, and into the infrared. Optical sensors are used in a variety of commercial and military applications. In some applications the optical sensors are fixed in orientation, and in others the optical sensor is movable such as by a pivoting motion to allow sensing over a wide angular range.

The optical sensors generally employ a photosensitive material that faces the scene and produces an electrical output responsive to the incident energy. The photosensitive material and remainder of the sensor structure are rather fragile, and are easily damaged by dirt, erosion, chemicals, or high wind velocity. The sensor is placed behind a window through which it views the scene and which protects the sensor from such external effects. The window must be transparent to the radiation of the operating wavelength of the sensor and resist attack from the external forces. The window must also permit the sensor to view the scene over the specified field of regard. This field of regard is the angular extent over which the sensor must be able to be pointed to view the scene. The field of regard may extend over wide angles and in two rotational directions. For example, a look-down sensor on a high-speed aircraft must have a field of regard that extends over large specified angles from front-to-back (elevational angle) and from side-to-side (azimuthal angle).

The window would ideally introduce minimal wavefront distortion of the scene over the field of regard of the sensor, particularly if the sensor is an imaging sensor. The larger and thicker the window, the more likely is the introduction of significant wavefront distortion. Where there is wavefront distortion, as is always the case to some degree, it is desirable that such wavefront distortion be of a predictable, regular type that may be compensated for with an optical device placed between the window and the sensor or by electrical circuitry or processing.

A wide variety of sensor windows have been used in various aircraft applications. In many cases such as low-speed helicopters, flat windows are acceptable. Windows that are shaped as segments of spheres or conic sections are used in aircraft applications, but for these windows the wavefront distortion tends to be high if the pupil of the sensor is large or not at a specific location, or if the field of regard is large. In all of these window types, if the window must be wide in order or must project a substantial distance into an airflow to permit a large field of regard, the aerodynamic drag introduced by the window is large.

For applications involving aircraft operating at high speeds, the window should be relatively aerodynamic such that the presence of the window extending into the airstream does not introduce unacceptably high and/or asymmetric aerodynamic drag to the vehicle. A conformal window is therefore beneficial to reducing drag and increasing the range of the aircraft. Existing conformal windows introduce large wavefront distortions into the sensor beam, particularly for high azimuthal pointing angles of the sensor.

There is a need for an improved window to be used in demanding applications such as look-down and side-looking sensor windows in high-speed aircraft. The present invention fulfills this need, and further provides related advantages.

SUMMARY OF THE INVENTION

The present invention provides a window shape that is suitable for use in sensor systems of high-speed aircraft. The window is shaped to produce minimal wavefront distortion over a wide field of regard. The window is conformal and introduces relatively minimal drag in the airflow.

In accordance with the invention, a window comprises a curved piece of a transparent material having a torus shape. The shapes of the front and/or back surfaces of the window are defined in Cartesian coordinates by $$Z(x,y)=Z_{prev}(x,y)+L_x(x,y)+L_y(y).$$

In this relation, $$Z_{prev}(x,y)=c\rho^2/[1+(1-(k+1)c^2\rho^2)^{1/2}]+d\rho^4+e\rho^6+f\rho^8+g\rho^{10},$$

$$\rho^2=x^2+y^2,$$

$$L_y(y)=C_y y^2/[1+(1-(k_y+1)C_y^2 y^2)^{1/2}]+d_y y^4+e_y y^6+f_y y^8+g_y y^{10},$$

$$L_x(x,y)=C_x x^2/[1+(1-(k_x+1)C_x^2 x^2)^{1/2}]+d_x x^4+e_x x^6+f_x x^8+g_x x^{10},$$

$$C_x(y)=C_0+C_1 y+C_2 y^2, \text{ and}$$

$$k_x(y)=k_0+k_1 y+k_2 y^1.$$

Here, $Z_{prev}(x,y)$ is a generalized aspheric shape of the typical optical surface. $L_y(y)$ is the parent profile of the torus shape. $L_x(x,y)$ is the profile parallel to the x-z plane sweeping along the parent profile. $C_x$ and $C_y$ are the curvatures of the profiles $L_x(x,y)$ and $L_y(y)$, respectively. The preferred values for $k_x$ and $k_y$ $-\infty \leq k_x<100$ and $-\infty \leq k_y<100$.

The values of c, k, d, e, f, g, $C_y$, $k_y$, $d_y$, $e_y$, $f_y$, $g_y$, $d_x$, $e_x$, $f_x$, $g_x$, $C_0$, $C_1$, $C_2$, $k_0$, $k_1$, and $k_2$ are constants for any selected window and define the shape of the window at any selected location (x, y, z) according to the relations set forth above. The coefficients $d_y$, $e_y$, $f_y$, $g_y$, $d_x$, $e_x$, $f_x$, and $g_x$ are higher order coefficients similar to a typical aspheric surface shape described by $L_{prev}(x,y)$. These coefficients modify the basic surface shape slightly to obtain better wavefront uniformity. There are no known limitations on the values over which the constants may range, except as noted.

The window is made of a material selected in conjunction with the operating wavelength of the sensor which is to be protected by the window. The sensor may be responsive to, for example, all or part of the ultraviolet, visible, and infrared ranges, and the window must be transparent to the range of interest. Materials of construction for windows in specific wavelength transparency ranges are known in the art.

The window of the invention is preferably used in a sensor system with a sensor operating at its selected operating wavelength. In such a sensor system, the sensor is positioned so that energy of the operating wavelength passes on an optical path through the window to impinge upon the sensor.

The sensor system may be used in an any of a variety of applications. The preferred applications are in manned or unmanned aircraft. The most preferred applications are in look-down sensors mounted below the fuselage of the aircraft.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
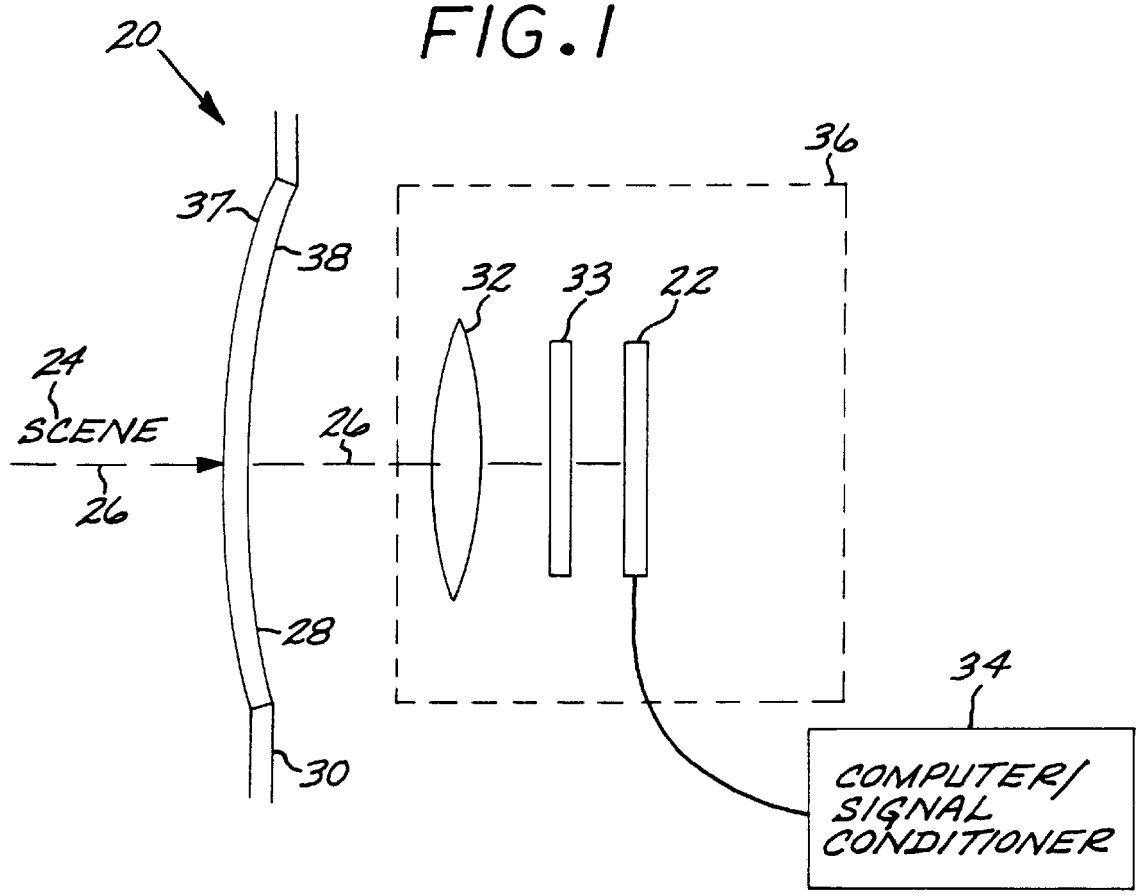
FIG. 1 is a schematic depiction of a sensor system.

FIG. 1 illustrates a sensor system 20 in general terms. The sensor system 20 includes a sensor, such as an illustrated focal plane array (FPA) sensor 22 used for imaging a scene 24. The structure of the sensor such as the sensor 22 may be selected to be sensitive to various types of radiation, such as ultraviolet, visible, or infrared, accordingly to principles well known in the art. Radiation from the scene 24 passes along an optical path 26 and through a window 28 fixed to a wall 30 such as the fuselage of an aircraft or missile. The window 28 has a front (outwardly facing) surface 37 and a back (inwardly facing) surface 38. The radiation then passes through directing and focusing optics selected for the particular geometry and requirements of the sensor system, and here represented schematically by a single lens 32. Optionally, a bias corrector 33, such as that described in U.S. Pat. No. 5,526,181, whose disclosure is incorporated by reference, is positioned between the window 28 and the sensor 22. The radiation is thereafter incident upon the sensor 22, which has as an output an electrical signal that is provided to electronics in the form of a computer and signal conditioner 34 (illustrated), a display (not illustrated), or other output or processing device. The computer may be used to digitally reduce distortion as a function of angular position of the viewed scene and to process the information of the image.

The sensor system 20 may be packaged in various forms for practical applications. The embodiment of FIG. 1 includes a housing 36 around the lens 32 and sensor 22. In another approach, the window 28 is one wall of the housing 36 rather than being fixed to the external wall. In yet another approach, the optical system represented by the lens 32 directs the optical path to a remote location at which the sensor 22 is located.

Figure 2:
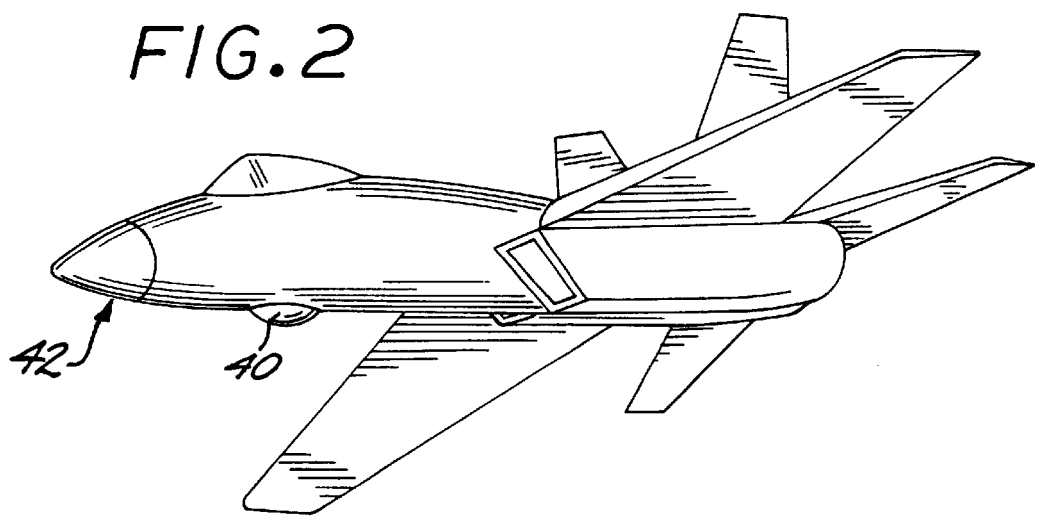
FIG. 2 is a perspective view of an aircraft with a look-down sensor system.
Figure 3:
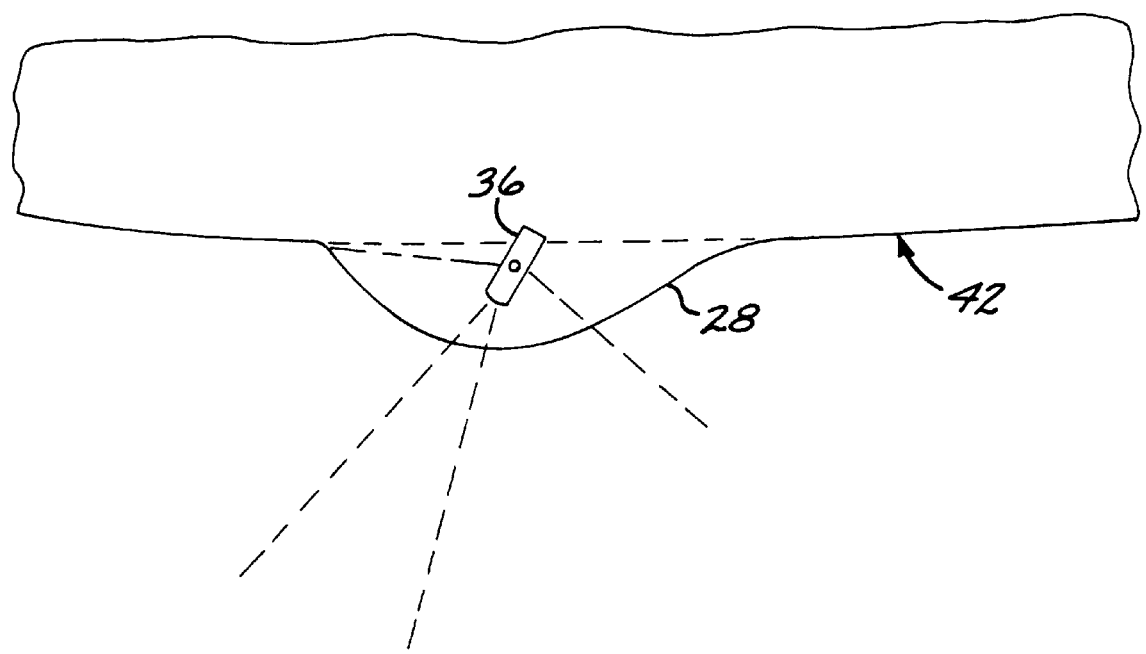
FIG. 3 is a schematic elevational sectional view of the sensor system of FIG. 2.
Figure 4:
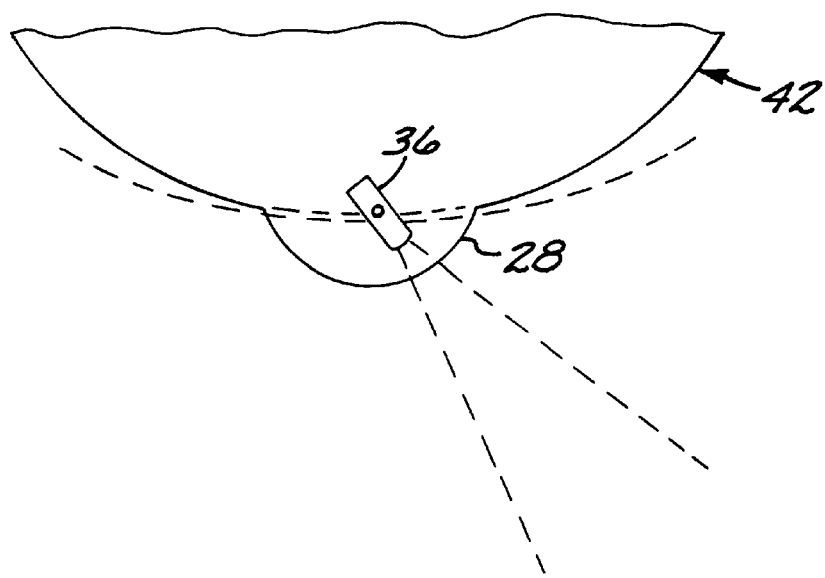
FIG. 4 is a schematic azimuthal sectional view of the sensor system of FIG. 2.

In an embodiment of particular interest to the inventors, a look-down sensor system 40 mounted in a chin location of an aircraft 42 is illustrated in FIG. 2. FIGS. 3 and 4 schematically illustrate a preferred implementation of the sensor system 40 of FIG. 2. The housing 36 is pivotably mounted on a gimbal and contains the optical components 32, 33, and 22. In another form of this embodiment, the sensor 22 is stationary and at least some of the optical train represented by the lens 32 is pivotably mounted on a gimbal system.

The fixed window 28 has several requirements. It must protect the sensor. It must allow the sensor an angular viewing range, the field of regard, that is reasonably large both in an elevational front/back sense illustrated in FIG. 3 and an azimuthal side-to-side sense illustrated in FIG. 4. It must be transparent to the radiation of interest so that it passes a high fraction of the incident radiation to the sensor with acceptably low wavefront distortion. The fixed window 28 extends into the airstream and therefore adds drag to the aircraft 42. The drag should be as acceptably low in conjunction with the other requirements.

Prior sensor windows have generally been flat, spherical, or a conic section. Flat windows have poor aerodynamics, and the required window size is large. Spherical and conic windows introduce large aberration if the sensor is not located at the optical center, which is difficult to achieve in most situations because that would cause the window to project quite far into the airstream. The large aberration results in a small pupil size and short effective viewing range for the sensor system.

According to the present approach, the window has a torus form, and more specifically is a segment of a torus. The torus may be viewed as a convex aspheric shape rotated about a center. Two examples of simple forms of a torus are a section of a donut and a section of a tire tube.

In precise mathematical terms, the shapes of the front 37 and/or back 38 surfaces of the window 28 are defined in Cartesian coordinates by $$Z(x,y)=Z_{prev}(x,y)+L_x(x,y)+L_y(y).$$

In this relation, $$Z_{prev}(x,y)=c\rho^2/[1+(1-(k+1)c^2\rho^2)^{1/2}]+d\rho^4+e\rho^6+f\rho^8+g\rho^{10},$$

$$\rho^2=x^2+y^2,$$

$$L_y(y)=C_y y^2/[1+(1-(k_y+1)C_y^2 y^2)^{1/2}]+d_y y^4+e_y y^6+f_y y^8+g_y y^{10},$$

$$L_x(x,y)=C_x x^2/[1+(1-(k_x+1)C_x^2 x^2)^{1/2}]+d_x x^4+e_x x^6+f_x x^8+g_x x^{10},$$

$$C_x(y)=C_0+C_1 y+C_2 y^2, \text{ and}$$

$$k_x(y)=k_0+k_1 y+k_2 y^1.$$

Here, $Z_{prev}(x,y)$ is a generalized aspheric shape of the typical optical surface. $L_y(y)$ is the parent profile of the torus shape. $L_x(x,y)$ is the profile parallel to the x-z plane sweeping along the parent profile. $C_x$ and $C_y$ are the curvatures of the profiles $L_x(x,y)$ and $L_y(y)$, respectively. The preferred values $k_x$ and ky are $-\infty \le k_x < 100$, and $-\infty \le k_y < 100$.

The values of c, k, d, e, f, g, $C_y$, $k_y$, $d_y$, $e_y$, $f_y$, $g_y$, $d_x$, $e_x$, $f_x$, $g_x$, $C_0$, $C_1$, $C_2$, $k_0$, $k_1$, and $k_2$ are constants for any selected window and define the shape of the window at any selected location (x, y, z) according to the relations set forth above. The coefficients $d_y$, $e_y$, $f_y$, $g_y$, $d_x$, $e_x$, $f_x$, and $g_x$ are higher order coefficients similar to a typical aspheric surface shape described by $L_{prev}(x,y)$. These coefficients modify the basic surface shape slightly to obtain better wavefront uniformity. There are no known limitations on the values over which the constants may range.

In a presently preferred form, the following values in the above-stated relations were selected for the shape of the inner and outer surfaces of the torus window.

For the inner window surface 38: $C_y=-0.295356\times10^{-1}$; $k_y=0.526770$; $d=-0.447510\times10^{-4}$; $e=0.215807\times10^{-6}$; $f=-0.544135\times10^{-9}$; $g=0.123169\times10^{-12}$; $C_o=-0.109298$; $k_o=-0.409707$; $d_x=0.161813-10^{-4}$; $e_x=-0.767598\times10^{-7}$; $f_x=-0.14917\times10^{-7}$; $g_x=0.443870\times10^{-10}$; $C_2=-0.617200\times10^{-4}$; and $k_2=0.894060\times10^{-3}$, other coefficients 0.

For the outer window surface 37: $C_y=-0.275862\times10^{-1}$; $k_y=1.59630$; $d=-0.398649\times10^{-4}$; $e=0.195487\times10^{-6}$; $f=-0.457949\times10^{-9}$; $g=0.207852\times10^{-12}$; $C_o=-0.104006$; $k_o-=1.66037$; $d_x=-0.165763\times10^{-3}$; $e_x=-0.519473\times10^{-6}$;

$f_x=-0.943807\times10^{-8}$; $g_x=-0.939299\times10^{-11}$; $C_2=-0.561027\times10^{-4}$; and $k_2=-0.850533\times10^{-3}$, other coefficients 0.

The torus window of the invention has important practical advantages. It has low distortion over a wide field of regard. Most importantly, the residual wavefront distortion of a torus window is in the nature of lower-order aberrations, such as focus, astigmatism, and coma. Such distortions may be corrected with an optical corrector. The torus window is relatively small and aerodynamically conformal. That is, it has relatively low, symmetrical drag.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A window, comprising:

a curved piece of a transparent material having a front surface and a back surface, at least one of the front surface and the back surface having a torus shape defined in Cartesian coordinates by the relation $$Z(x,y)=Z_{prev}(x,y)+L_x(x,y)+L_y(y).$$

wherein $$Z_{prev}(x,y)=c\rho^2/[1+(1-(k+1)c^2\rho^2)^{1/2}]+d\rho^4+e\rho^6+f\rho^8+g\rho^{10},$$

$$\rho^2=x^2+y^2,$$

$$L_y(y)=C_y y^2/[1+(1-(k_y+1)C_y^2 y^2)^{1/2}]+d_y y^4+e_y y^6+f_y y^8+g_y y^{10},$$

$$L_x(x,y)=C_x x^2/[1+(1-(k_x+1)C_x^2 x^2)^{1/2}]+d_x x^4+e_x x^6+f_x x^8+g_x x^{10},$$

$$C_x(y)=C_0+C_1 y+C_2 y^2, \text{ and}$$

$$k_x(y)=k_0+k_1 y+k_2 y^1.$$

wherein c, k, d, e, f, g, $C_y$, $k_y$, $d_y$, $e_y$, $f_y$, $g_y$, $d_x$, $e_x$, $f_x$, $g_x$, $C_0$, $C_1$, $C_2$, $k_0$, $k_1$, and $k_2$ are constants.

2. The window of claim 1, wherein $-\infty \leq k_x < 100$, and $-\infty \leq k_y < 100$.

3. The window of claim 1, wherein the transparent material is transparent to ultraviolet energy.

4. The window of claim 1, wherein the transparent material is transparent to visible light.

5. The window of claim 1, wherein the transparent material is transparent to infrared energy.

6. A sensor system, comprising:

a sensor operable at an operating wavelength; and a window positioned so that energy of the operating wavelength passes on an optical path through the window to impinge upon the sensor, the window comprising a curved piece of a transparent material having a front surface and a back surface, at least one of the front surface and the back surface having a torus shape defined in Cartesian coordinates by the relation $$Z(x,y)=Z_{prev}(x,y)+L_x(x,y)+L_y f(y),$$

wherein $$Z_{prev}(x,y)=c\rho^2/[1+(1-(k+1)c^2\rho^2)^{1/2}]+d\rho^4+e\rho^6+f\rho^8+g\rho^{10},$$

$$\rho=x^2+y^2,$$

$$L_y(y)=C_y y^2/[1+(1-(k_y+1)C_y^2 y^2)^{1/2}]+d_y y^4+e_y y^6+f_y y^8+g_y y^{10},$$

$$L_x(x,y)=C_x x^2/[1+(1-(k_x+1)C_x^2 x^2)^{1/2}]+d_x x^4+e_x x^6+f_x x^8+g_x x^{10},$$

$$C_x(y)=C_0+C_1 y+C_2 y^2, \text{ and}$$

$$k_x(y)=k_0+k_1 y+k_2 y^2.$$

wherein c, k, d, e, f, g, $C_y$, $k_y$, $d_y$, $e_y$, $f_y$, $g_y$, $d_x$, $e_x$, $f_x$, $g_x$, $C_0$, $C_1$, $C_2$, $k_0$, $k_1$, and $k_2$ are constants.

7. The sensor system of claim 6, wherein $-\infty \leq k_x < 100$, and $-\infty \leq k_y < 100$.

8. If the sensor system of claim 6, wherein the operating wavelength is in the ultraviolet.

9. The sensor system of claim 6, wherein the operating wavelength is in the visible.

10. The sensor system of claim 6, wherein the operating wavelength is in the infrared.

11. The sensor system of claim 6, further including a bias corrector positioned along the optical path between the window and the sensor.

* * * * *

UNITED STATES PATENT AND TRADEMARK OFFICE
CERTIFICATE OF CORRECTION

PATENT NO. : 5,914,821
DATED : June 22, 1999
INVENTOR(S) : Chungte W. Chen

It is certified that error appears in the above-identified patent and that said Letters Patent is hereby corrected as shown below:

In column 2, line 25, please delete "$L_y(y)=C_y y^2$", and insert --$L_y(y)=C_y y^2$--.

In column 2, line 30, please delete "$k_2 y^1$", and insert --$k_2 y^2$--.

In column 4, line 32, please delete "$L_y(y)=C_y y^2$", and insert --$L_y(y)=C_y y^2$--.

In column 4, line 37, please delete "$k_2 y^1$", and insert --$k_2 y^2$--.

In column 5, line 31, please delete "$L_y(y)=C_y y^2$", and insert --$L_y(y)=C_y y^2$--.

In column 5, line 36, please delete "$k_2 y^1$", and insert --$k_2 y^2$--.

In column 6, line 15, please delete "$L_y f(y)$" and insert --$L_y(y)$--.

UNITED STATES PATENT AND TRADEMARK OFFICE
CERTIFICATE OF CORRECTION

PATENT NO. : 5,914,821
DATED : June 22, 1999
INVENTOR(S) : Chungte W. Chen

It is certified that error appears in the above-identified patent and that said Letters Patent is hereby corrected as shown below:

In column 6; line 22, please delete "$L_y(y)=C_y y^2$", and insert --$L_y(y)=C_y y^2$--.

Signed and Sealed this

Twenty-fifth Day of January, 2000

Attest:

*Attesting Officer*

*Acting Commissioner of Patents and Trademarks*